June 11, 1968  J. HOEKSTRA  3,388,077
CATALYST FOR TREATMENT OF COMBUSTIBLE WASTE PRODUCTS
Filed April 1, 1963  2 Sheets-Sheet 1

INVENTOR:
James Hoekstra

BY:
ATTORNEYS

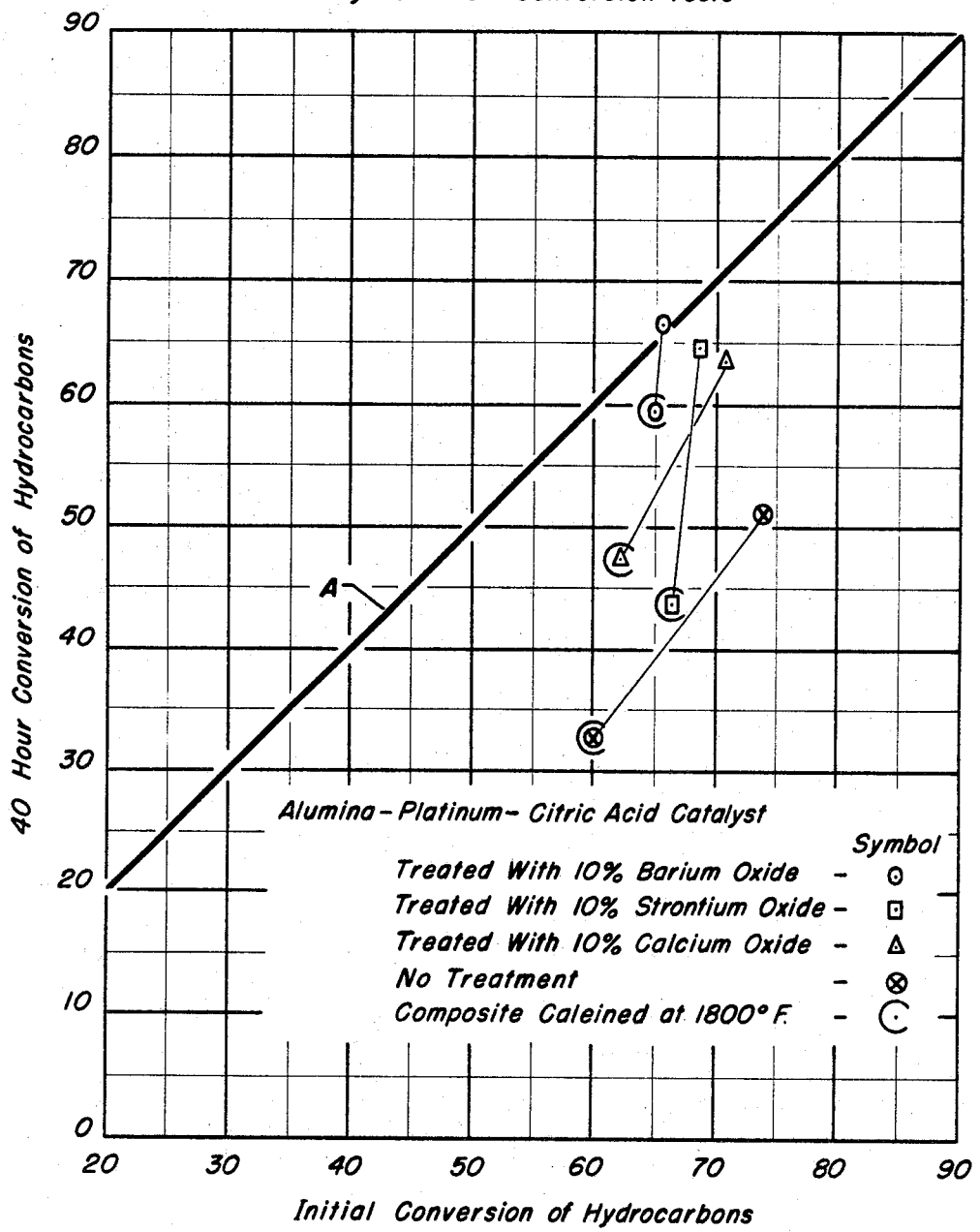

United States Patent Office 3,388,077
Patented June 11, 1968

3,388,077
CATALYST FOR TREATMENT OF COMBUSTIBLE WASTE PRODUCTS
James Hoekstra, Evergreen Park, Ill., assignor to Universal Oil Products Company, Des Plaines, Ill., a corporation of Delaware
Filed Apr. 1, 1963, Ser. No. 269,327
3 Claims. (Cl. 252—466)

ABSTRACT OF THE DISCLOSURE

A catalyst suitable for oxidizing noxious gases comprising an alumina carrier particle having a calcium, strontium or barium component distributed therethrough and having an internal layer of a catalytic metal component spaced from the surface and from the center of the particle.

Figure 1:
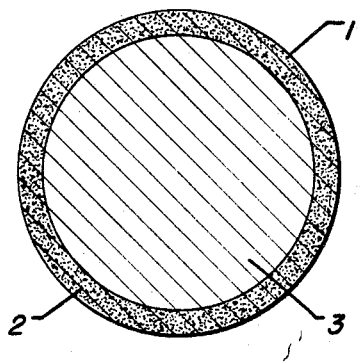

The present invention relates to the treatment of combustible waste products, prior to discharging the same into the atmosphere, and involves the preparation of an improved catalytic composite having a novel physical structure and composition and the use of such catalytic composite.

More specifically, the invention described herein is directed toward the use of a catalyst, having particular characteristics enhancing its stability and lead resistance ability when effecting the conversion of auto exhaust gases or other gaseous, combustible waste products of a noxious nature, into innocuous components for the primary purpose of eliminating the adverse effects exhibited by such waste products upon the atmosphere.

While the catalytic composite encompassed by the present invention is especially adaptable to the elimination of the products of incomplete combustion from the hydrocarbonaceous exhaust gases emanating from an internal combustion engine, prior to effecting the discharge of such hydrocarbonaceous exhaust gases into the atmosphere, there are also other obnoxious products which may well be treated. For example, unsaturated hydrocarbons, alcohols, ketones, aldehydes, acids, etc., as well as carbon monoxide and oxides of nitrogen and sulfur, etc., comprise objectionable materials.

The desirability and importance of effecting the removal of noxious components from automotive exhaust gases, or the conversion thereof into innocuous components, is now well recognized. At least one state, California, has passed legislation recognizing the inherent danger to the public health and welfare as such noxious gaseous material continues to be discharged into the atmosphere, and, in this regard, has appropriately instituted a Motor Vehicle Pollution Control Board having as its primary purpose the elimination or conversion of these noxious components.

The primary object of the present invention is, therefore, to provide a method for the catalytic treatment, and the catalyst for use therein, of noxious, combustible gaseous waste products for the purpose of eliminating the noxious material and/or converting the same into innocuous components. A related object is to produce a catalytic composite having a novel composition and physical structure and the propensity for effecting the oxidation of a hydrocarbon-containing mixture including carbon monoxide, as well as the capability to effect such conversion for a prolonged period of time.

Prior associated work has discovered the improved oxidation and/or conversion of waste gases through the use of an impregnating agent to assist in positioning the active component layer a finite distance below the surface of the carrier material. It has now been discovered that an alkaline earth component, particularly barium, calcium, and strontium, when incorporated into the catalyst composite, is critically important in improving the stability or life of the catalyst, as well as effecting a decrease in lead pick-up where the catalyst is subjected to exhaust gas fumes from engines using leaded fuels. It appears that the alkaline earth component may be impregnated into the porous carrier material of the catalyst composite before or after the impregnation with the active component and that good results are obtained with either method. It still further appears that barium, calcium or strontium in suitable amounts in the catalyst composite will materially assist in making a physically stronger particle.

A broad embodiment of the present invention encompasses a catalytic particle comprising an inorganic oxide carrier material and a catalytically active metallic component embedded as a layer within said carrier material, such layer being disposed a finite distance below the exterior surface of said carrier material and a finite distance from the center thereof, and an alkaline earth component selected from the group consisting of calcium, barium and strontium.

Another broad embodiment of the present invention involves a method of preparing a catalytic composite which comprises impregnating an inorganic oxide carrier material with an alkaline earth component selected from the group consisting of calcium, strontium and barium, and with a catalytically active metalli ccomponent and from about 0.1% to about 1.5% by weight, based upon the weight of said carrier material, of an organic acid selected from the group consisting of dibasic acids and derivatives thereof, having the following structural formula:

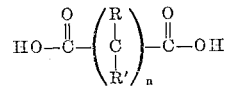

where:

R is selected from hydrogen, hydroxyl and alkyl groups;
R' is selected from hydrogen, alkyl and carboxyl groups; and
$n$ is within the range of 0 to 6.

Another broad embodiment of the present invention involves a method of preparing a catalytic composite which comprises impregnating an inorganic oxide carrier material with a solution of an alkaline earth component selected from the group consisting of calcium, strontium and barium, rinsing and drying the impregnated carrier material and then commingling it with a catalytically active metallic component and from about 0.1% to about 1.5% by weight, based upon the weight of said carrier material, of an organic acid selected from the group consisting of dibasic acids and derivatives thereof, having the following structural formula:

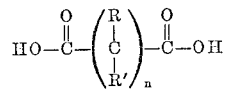

where:

R is selected from hydrogen, hydroxyl and alkyl groups;
R' is selected from hydrogen, alkyl and carboxyl groups; and
$n$ is within the range of 0 to 6.

A more specific embodiment of the present invention affords a method of preparing a catalytic composite of alumina, an alkaline earth component and a platinum component, which method comprises commingling said alumina with chloroplatinic acid and from about 0.13% to about 0.70% by weight, based upon the weight of said alumina, of an organic acid selected from the group consisting of dibasic acids and derivatives thereof, having the following structural formula:

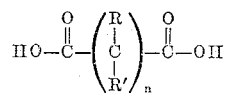

where:

R is selected from hydrogen, hydroxyl and alkyl groups;
R' is selected from hydrogen, alkyl and carboxyl groups; and $n$ is within the range of 0 to 6, drying the resulting mixture at a temperature within the range of from about 100° F. to about 250° F., subsequently subjecting the mixture to an atmosphere of hydrogen at a temperature within the range of from about 200° F. to about 1800° F., thereafter impregnating the resulting material with a solution of a component selected from the group consisting of barium, strontium and calcium, and then drying the resulting catalyst composite.

As hereinbefore stated, the present invention produces a catalytic composite especially adaptable for the conversion of automobile exhaust gases prior to discharging such waste products into the atmosphere. Therefore, another broad embodiment of the present invention relates to a method for the conversion of noxious, gaseous combustible waste products to be discharged into the atmosphere, which method comprises contacting said waste products with a catalytic composite of an inorganic oxide carrier material, a catalytically active metallic component embedded as a layer within said carrier material, and disposed a finite distance below the exterior surface of said carrier material and a finite distance from the center thereof, and an alkaline earth component selected from the group consisting of calcium, strontium and barium.

Another limited embodiment of the present invention involves a method for eliminating hydrocarbons from gases containing the same which comprises contacting said gases, at conversion conditions, with a catalytic composite of alumina and a platinum component, said catalytic composite being prepared by commingling said alumina with a solution of an alkaline earth component selected from the group consisting of calcium, strontium and barium, and also commingling a platinum-containing compound and from about 0.13% to about 0.70% by weight, based upon the weight of said alumina, of an organic acid selected from the group consisting of dibasic acids and derivatives thereof, having the following structural formula:

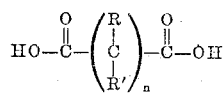

where:

R is selected from hydrogen, hydroxyl and alkyl groups;
R' is selected from hydrogen, alkyl and carboxyl groups; and $n$ is within the range of 0 to 6.

The alkaline earth component may be combined with the sol in the preparation of the base or composited with the carrier material either prior to, or after, the impregnation thereof with the active platinum component and it is not intended to limit the improved catalytic composite to any one sequence of steps of preparation, although one method may provide improved results in use, as compared to another method.

As hereinbefore set forth, the method of the present invention involves the catalytic treatment of noxious, gaseous combustible waste products prior to discharging the same into the atmosphere. The catalytic composite for use therein, hereinafter described in detail, may be placed in any suitable container, or catalytic converter, and installed within the exhaust line in such a manner that the gaseous waste products are passed therethrough. The catalytic converter may be of the throughflow, crossflow or radial-flow design, and, when utilized in the conversion of the noxious components emanating from an internal combustion engine, may either supplant, or be combined with the common acoustic muffler. Combustion air is injected ahead of the converter inlet, usually by an aspirator or suitable external compressive means, and the waste products, together with air, are passed through the catalyst in either upward or downward flow, cross-flow or radial-flow. When employed in other applications, such as the treatment of the gaseous waste products from the printing, tanning and petrochemical industries, the catalytic composite may be conveniently disposed as a fixed bed within the stack, or other outlet ducts, of a suitable combustion chamber, the combustion products and air being passed in admixture into contact with the catalyst prior to being discharged into the atmosphere. The precise physical structure of the catalytic converter, the means for introducing combustion air, and the disposition of the catalytic composite within the converter are dependent to a large extent upon the application and the function to be served.

A wide variety of factors affect the stability of active catalytic composites, and are generally peculiar to the environment in which the catalyst is employed. For example, an automotive internal combustion engine is commonly operated over a wide range of speed and load conditions including idling, cruising, accelerating and decelerating and, therefore, the combustion efficiency of such an engine is varied considerably. The space velocity and temperature of the manifold exhaust gases, as well as the concentration of combustible material therein, will similarly vary over relatively wide limits. Therefore, when applied to the treatment of the noxious exhaust gases from an automotive internal combustion engine, the catalyst must necessarily have the inherent capability of withstanding high temperatures of the order of 1600° F. to as high as about 2000° F., and should possess high activity at substantially lower temperatures. The catalyst should have a relatively low threshold activation temperature in order that the necessary conversion reactions become self-initiating within a minimum period of time following the startup of the engine at relatively cold conditions. These characteristics have been recognized as essential by the Motor Vehicle Pollution Control Board in setting forth the specifications relating to the efficiency with which the noxious components are eliminated or converted. The catalyst must, therefore, necessarily operate in a satisfactory manner at a temperature which can conceivably vary from about 200° F. to as high as about 2000° F., at any given time.

The catalytic composite of the present invention is characterized by the fact that it contains an alkaline earth component selected from the group consisting of calcium, strontium and barium and at least one catalytically active metallic component. Actually, of the alkaline earth components, barium appears to provide the better results and is thus generally preferred in the composite. As employed in the present specification, as well as in the appended claims, the term "metallic component" is intended to connote those components of the catalyst which are employed for their catalytic activity in converting the noxious material into innocuous components, as distinguished from that portion of the catalyst herein referred to as the refractory inorganic oxide, and which is employed for the purpose of supplying a suitable carrier material, or support, for the "catalytically active metallic components." Although not considered to be a limiting feature of the present invention, it is preferred that the catalytically active metallic component, or components, be composited with a refractory inorganic oxide carrier material which has an apparent bulk density less than about 0.4 gram per cc. Preferred refractory inorganic oxides, for use as the carrier material, possesses an apparent bulk density within the range of about 0.15 to about 0.35 gram per cc. The catalytically active metallic components, composited with the refractory inorganic oxide carrier material, may be one or more of the following: vanadium, chromium, molybdenum, tungsten, members of the iron-group and platinum-group of the Periodic Table, copper, silver and gold. A particular metal may be used in and of itself, or in combination with any of the foregoing metals. The catalyst of the present invention may comprise a metallic component selected from Groups V–A, VI–A and VIII of the Periodic Table. Thus, the catalyst to be employed in the treatment of noxious, gaseous combustible waste products, prior to discharging the same into the atmosphere, may comprise the following: platinum, palladium, other noble metals such as iridium, ruthenium, and rhodium, iron, cobalt, nickel, copper, vanadium, tungsten, molybdenum, silver, gold, and various mixtures including platinum-iron platinum-cobalt, platinum-nickel, palladium-iron, palladium-cobalt, palladium-nickel, platinum-palladium, palladium-copper-cobalt, copper-cobalt-nickel-platinum, platinum-palladium-cobalt, etc. It is understood that the catalytic activity, stability, auto-initiating temperature, and other characteristics of the catalyst of the present invention, may vary from catalyst to catalyst. Many of the specific catalytic composites discussed herein do not necessarily yield equivalent results when compared with a catalyst comprising one or more different metallic components, or when utilized under varying conditions in different applications. Thus, the amount of catalytically active metal component may be present in an amount from about 0.01% to about 10% by weight of the carrier, depending upon the particular metal component being used. Although the precise manner in which the catalytically active metallic component, such as platinum, is disposed within the carrier material, is not known with absolute certainty, it is believed that the platinum, or other metallic component, enters into a complex combination with the carrier material and other components of the catalyst. Therefore, it is understood that the use of the term "platinum" or "metallic component," for example, connotes platinum or other metallic components existing within the carrier material in a combined form and/or in the elemental state.

The catalytic composite of the present invention, the method of preparation of which is hereinafter set forth in greater detail, utilizes a refractory inorganic oxide as the carrier material for the active metallic components hereinbefore set forth. Refractory inorganic oxides possess particular physical characteristics which readily permit adaptation thereof to the rather unique environment encountered in the operation of a motor vehicle, as well as in other commercial applications. One desired physical characteristic, for example, is that extremely high temperatures do not apparently affect the capability of the material to function as desired. The refractory inorganic oxide carrier material, for utilization in the catalyst of the present invention, may be manufactured by any suitable method including separate, successive, co-precipitation means of manufacture when comprising two or more individual inorganic oxides. The carrier material may comprise naturally-occurring substances such as clays or earths, and may or may not be activated prior to use by one or more treatments including drying, calcining, steaming, or treatments with various reagents, etc. The catalytic composite of the present invention will preferably make use of an alumina-containing refractory inorganic oxide carrier material: as employed herein, the term "alumina" is intended to include porous aluminum oxide in various states of hydration. In addition to alumina, other refractory inorganic oxides may be employed, either in conjunction with, or instead of, the alumina. Other suitable inorganic oxides include silica, boria, thoria, titania, zirconia, hafnia, and mixtures of two or more. The incorporation of any of the foregoing refractory inorganic oxides, in conjunction with the alumina, is generally dependent upon the desire to add thereto certain physical and/or chemical characteristics required by the particular application for which the catalytic composite is intended. Such other refractory inorganic oxides, for example, silica, will be present within the carrier material in an amount within the range of about 0.5% to about 25.0% by weight thereof, based upon the final weight of the carrier. Intermediate quantities are preferred and will lie within the range of about 1.0% to about 10.0% by weight. The carrier material may take the form of any desired shape such as spheres, pills, extrudates, granules, cakes, briquettes, rings, etc. The preferred form is the sphere, and spheres may be continuously manufactured by the well-known oil-drop method: this method is described in detail in U.S. Patent No. 2,620,314 issued to James Hoekstra. In the interest of simplicity and clarity, the following discussion will be restricted to the use of alumina as the refractory inorganic oxide carrier material.

Various methods of impregnation may be used to impregnate the carrier material with the added alkaline earth components. Generally, a water soluble compound of the particular component is used to soak the carrier or the activated composite so as to insure a bond of the component, as a resulting oxide with the carrier. Thus, the barium, strontium or calcium compound may be in the form of a hydroxide, a formate, a nitrate, etc., when used to impregnate the carrier or composite. Impregnation may be adequately accomplished in a one or two hour soaking, however, generally the soaking will be carried out for 4 to 20 hours or the like to provide optimum results. After the impregnation the composite is subjected to drying by heating or the use of a rotary evaporator. It appears also that impregnation with the added component may be before or after impregnation with the active metallic catalytic component although equivalent activity stabilities, crushing strengths and lead resistances may not be obtained from the different methods of compositing. It further appears, as will be set forth in more detail hereinafter, that the added component shall be present in an amount greater than 1% by weight of the resulting composite, so as to improve such composite for effecting the oxidation and conversion of noxious waste gases.

Where desired, halogen may be combined with the alumina and the catalytically active metallic components, and may be added thereto in any suitable manner either before, or after the incorporation of the active metallic components. The addition of the halogen is generally accomplished through the use of an acid such as hydrogen fluoride and/or hydrogen chloride, or volatile salt such as ammonium fluoride and/or ammonium chloride, and the halogen may be combined with the alumina during the preparation of the latter. In still another method of manufacture, the halogen may be composited with a refractory oxide during the impregnation thereof with the catalytically active metallic components. Thus, where the alumina is prepared from an alumina hydrosol having an alumina to chloride weight ratio of about 1:3, the use of such method permits the incorporation of chloride where the latter is desired as the halogen component.

Regardless of the particular refractory inorganic oxide carrier material employed, the catalytically active metallic components may be added thereto in any suitable, convenient manner. However, in accordance with the present invention, prior to or during the addition of the metallic component, such as platinum, the preformed inorganic oxide particles, such as alumina, are treated with an organic acid selected from a particular group thereof. In some instances, the organic acid may be combined with the metallic component, for example, a water-soluble platinum-containing compound, and the resulting mixture then added to the alumina particles. The selected organic acid may be added to the alumina particles as a separate solution just prior to commingling with the metallic component. For ease in handling and metering, the organic acid is preferably admixed, in the requisite quantity, with the water-soluble compound of the intended catalytically active metallic component, and the resulting impregnating solution combined with the carrier material. With respect to platinum, suitable water-soluble compounds for utilization in the impregnating solution include chloroplatinic acid, chloroplatinous acid, platinous chloride, platinic chloride, etc. Where the catalytic composite is intended to contain other metallic components, such as those hereinbefore set forth, the composite may be prepared by commingling water-soluble compounds of these components, particularly the nitrates, sulfates, chlorates, chlorides, or carbonates, and immersing the particles of the carrier material therein, followed by heating to form the corresponding oxides of the metallic components.

The organic acid utilized in the method of the present invention is selected from the group consisting of dibasic acids and derivatives thereof, having the following structural formula:

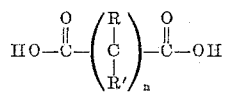

where:

R is selected from hydrogen, hydroxyl and alkyl groups;
R' is selected from hydrogen, alkyl and carboxyl groups and
$n$ is within the range of 0 to 6.

As hereinafter indicated in a specific example, other organic acids including acetic and tetraacetic acids do not suffice to achieve the desired object for which such organic acid is utilized. In accordance with the structural formula given above, suitable organic acids for use in preparing the catalytic composite of the present invention include, but not by way of limitation, oxalic, malonic, succinic, glutaric, adipic, pimelic, suberic, malic, tartaric, citric, 2 methyl succinic, 2,3 di-ethyl succinic, 2,2 dimethyl succinic, mixtures of two or more, etc. The quantity of the dibasic organic acid, or derivative thereof, for example, tartaric acid, to be employed in admixture with the water-soluble compound of the catalytically active metallic component and the carrier material, is based upon the weight of such carrier material. The amount of organic acid employed is within the range of about 0.1% to 1.5% by weight. An intermediate concentration of the organic acid and/or its derivative is preferred, and is within the range of from about 0.13% to about 0.70% by weight, based upon the weight of the carrier material. Through the utilization of the method of the present invention which principally comprises treating the carrier material with a particular quantity of a particular organic acid, the use of lesser quantities of the active metallic components to achieve the desired end result is permitted.

The quantity of the catalytically active metallic components is based upon the volume of the carrier material to be combined therewith, and is calculated on the basis of the elemental metal, notwithstanding that the metallic component may exist in some combined complex form, or in the elemental state. Thus, with respect to platinum-group metals, the platinum will be present in an amount of from about 0.05 to about 2.0 troy ounces per cubic foot of carrier material, i.e., 0.01% to 1.0% by weight of a low density alumina within the range of about 0.15 to 0.35 gram per cubic centimeter density. The preferred range of the concentration of the platinum component, dictated by economic considerations, is from about 0.15 to about 0.60 troy ounce per cubic foot of carrier material. The other metallic components, either in conjunction with, or instead of the platinum component, will be present in an amount of from about 0.01 to about 2.0 troy ounces per cubic foot of carrier material employed.

The organic acid may be employed as a mixture of two or more, and may be diluted with any suitable non-alkalinous solubilizing substances such as water, alcohol, acetone, etc. Of the organic acids above set forth, citric, oxalic, and tartaric acids are the preferred organic acids to be employed in the method of the present invention, citric acid being particularly preferred. The organic acid may be admixed with the water soluble compound of the catalytically active metallic component, or components, or mixed with the alumina prior to the addition of the metallic component thereto. In any case, it is an essential feature of the present invention that the metallic component be not combined with the alumina prior to the addition of the organic acid. Basic impregnation in preparing the improved catalyst is avoided, in that the commingling of the refractory inorganic oxide, the catalytically active metallic component and the organic acid is accomplished in the absence of substances and reagents of a highly alkaline nature, particularly including ammonia and other nitrogenous compounds, alkali metal compounds, etc. It has further been found that the catalytic composite is adversely affected when contacted with a nitrogen-containing gas during the final high temperature stages of the manufacture thereof.

In describing the method of manufacturing the catalytic composite encompassed by the present invention, it is understood that the same is not considered to be unduly limited to the particular catalytic composite described. The catalyst, in one example, is prepared by initially forming alumina spheres, 1/16-inch to about 3/16-inch in diameter, from an aluminum chloride hydrosol having an aluminum chloride weight ratio of about 1.25. The alumina spheres are continuously prepared by passing droplets of the hydrosol into an oil bath maintained at an elevated temperature, retaining the droplets within the oil until the same set into hydrogel spheroids. The spheroids are dried at a temperature of from about 200° F. to about 800° F., and thereafter subjected to a calcining treatment at a temperature of from about 800° F. to about 1200° F. An impregnating solution of barium hydroxide is used to soak about 150 grams of the alumina spheres for an overnight period, approximately 16 to 20 hours, and then they are rinsed and dried at about 200° to 450° F. to provide approximately 6% barium by weight of the composite. An impregnating solution of chloroplatinic acid, having the concentration of 0.0628 gram of platinum per milliliter, is prepared by diluting 3.0 milliliters to about 500 milliliters with water. When utilized with the approximately 150 grams of the alumina-barium spheres, having an apparent bulk density of about 0.29 gram per cc., this concentration of the chloroplatinic acid solution will yield a final composite having about 0.32 troy ounce of platinum per cubic foot of the spherical alumina carrier material. The chloroplatinic acid solution is commingled with about 0.52 gram of citric acid, or about 0.35% by weight based upon the weight of the spheres. The resulting mixture of citric acid, chloroplatinic acid and alumina-barium spheres is evaporated to dryness in a rotating dryer at a temperature of about 210° F. When the spheres appear visually dry, usually in about 2 to about 8 hours, the impregnates spheres are subjected to a reducing treatment, preferably in an atmosphere of hydrogen, while increasing the temperature to a level within the range of about 200° F. to about 1800° F., maintaining the elevated temperature for about 2 hours. Contrary to presentday methods of manufacturing catalytic composites, the catalyst of the present invention is not subjected to an oxidation treatment at elevated temperature, or to high-temperature calcination in an atmosphere of air. A high temperature oxidation treatment tends to destroy both the initial activity, and more particularly, the stability of the catalytic composite to effect the removal and/or conversion of the noxious components in the combustible gaseous waste products. Furthermore, oxidation in air will cause the catalytic composite to come in contact with nitrogen at an elevated temperature, and, as hereinafter indicated, such treatment tends to destroy the stability of the catalytic composite.

In an alternative embodiment, the catalyst preparation is carried out in a manner similar to that just described except that the chloroplatinic acid and citric acid impregnation is carried out prior to the barium hydroxide treatment. Also, the compositing of the barium may be after drying but prior to the hydrogen reduction treatment or after the reduction.

From the foregoing description, it will be noted that the inorganic oxide carrier material and additive component is combined with a catalytically active metallic component, with the latter being composited in all instances, in the presence of a particular quantity of an organic acid selected from the group consisting of dibasic organic acids and derivatives thereof, having the following structural formula:

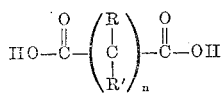

where:

R is selected from hydrogen, hydroxyl and alkyl groups;
R' is selected from hydrogen, alkyl and carboxyl groups, and
$n$ is within the range of 0 to 6.

The concentration of the organic acid is from about 0.1% to about 1.5%, and is based upon the weight of the carrier material to be impregnated with the active metallic component. It is recognized that the prior art teaches broadly the "activation" of refractory inorganic oxides through the utilization of various reagents including organic acids. Such "activation" is, however, immediately followed by a high temperature calcination treatment prior to the incorporation of the catalytically active metallic components. The use of an alkaline earth component, and particularly calcium, strontium or barium, together with a particular concentration of the organic acid and an active metallic catalyst component as utilized in the method and the manner heretofore set forth, results in a catalytic composite having a physical structure heretofore not obtained. This phenomenon is more clearly described and illustrated in the accompanying FIGURES 1, 2, 3 and 4. These figures illustrate the cross-section of an alumina or alumina-alkaline earth component spherical particle, taken through the center thereof, which particle contains a platinum component as the catalytically active metallic component. By testing alumina spheres, having calcium, barium and strontium impregnations, to determine the distribution of the alkaline earth component, it was found that the distribution of such component was substantially uniform throughout the sphere, conversely to platinum which tend to stay in a layer or core unless the impregnation is carried out in the presence of ammonia or alkaline conditions.

With reference now in particular to FIGURE 1, there is illustrated an alumina-alkaline earth-platinum composite prepared in the absence of the organic acid, or with an organic acid in a concentration less than about 0.10% by weight based upon the weight of alumina. In the figure, numeral 1 denotes the exterior surface of the entire sphere, number 2 denotes a continuous finite layer of the platinum component and number 3 refers to the porous alumina core, noted to be virtually free from the platinum component. It will be further noted, upon reference to FIGURE 1, that the absence of the organic acid, or the use of too little organic acid during the impregnation of the sphere, has produced a catalytic particle in which virtually the entire quantity of the catalytically active metallic component resides on the surface thereof.

Figure 2:
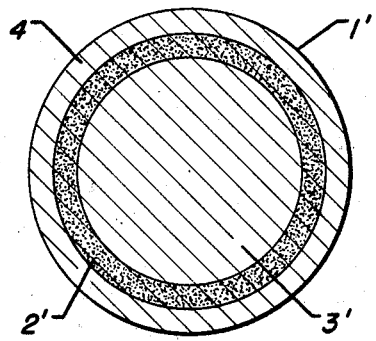

With reference to FIGURE 2, illustrating the cross-section of an alumina-alkaline earth sphere impregnated with a platinum component and a dibasic acid, and/or derivative thereof, from the group of acids hereinbefore defined, in accordance with the method of preparing the improved catalyst, numeral 1' connotes the exterior surface of the entire sphere, 2' refers to the totally embedded continuous layer of the platinum component, 3' indicates the inner core of alumina-alkaline earth component (virtually free from the platinum component), and numeral 4 indicates an outer band of alumina-alkaline earth component also virtually free from the platinum component. It is thus noted that the use of the organic acid produces a catalytic particle in which the catalytically active metallic component is embedded as a layer within the refractory inorganic oxide composite, and is disposed a finite distance from the exterior surface and a finite distance from the center thereof.

Figure 3:
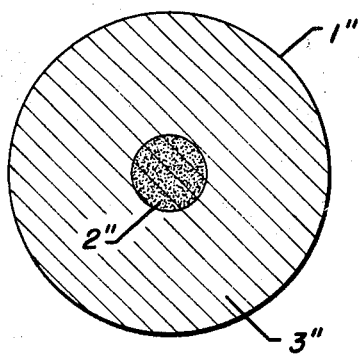
Figure 4:
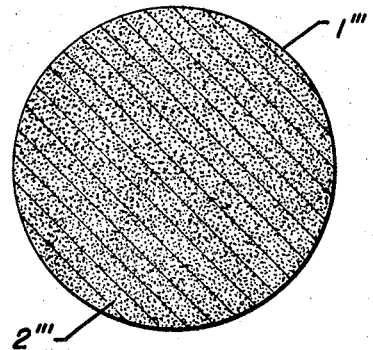

With reference to FIGURE 3, 1" denotes the entire spherical particle, 2" a virtually solid inner core of the platinum component and 3" indicates a wide outer band of alumina-alkaline earth component. The catalytic particle illustrated in FIGURE 3 results when the organic acid is employed in a concentration greater than about 1.5% by weight, based upon the weight of the alumina. Upon reference to FIGURE 4, 1''' denotes the entire spherical particle while 2''' denotes the carrier interior in which the platinum component is quite thoroughly and evenly distributed. A catalytic particle having the structural character illustrated in FIGURE 4, results when the organic acid is employed in the presence of ammonia or other strongly alkalinous-acting material, notwithstanding that the organic acid concentration may lie within the range of from about 0.1% to about 1.5% by weight.

In addition to the aliphatic, organic dibasic acids, and derivatives thereof hereinabove described, aromatic organic acids containing a hydroxyl group adjacent to the carboxylic group, have been found, which when employed in accordance with the method of the present invention, produce a catalytic particle having the structure shown in FIGURE 2. For example, salicylic acid, when utilized in an amount within the range of about 0.1% to about 1.5% produced a platinum-containing catalytic particle in which the totally embedded layer of the platinum component was clearly visible to the naked eye. Derivatives of such aromatic, organic acids, including gamma resorcylic acid, and others having a hydroxyl group adjacent the carboxylic group, also result in such a physical structure.

It is readily ascertained that the use of an alkaline earth component selected from the group consisting of calcium, strontium or barium, along with the method set forth to produce a catalytic particle having a unique physical structure in which the active metallic component is completely embedded as a layer within the particle, and is disposed a finite distance from the center and exterior surface of the particle, has provided an improved stable catalyst with lead resistance. As hereinbefore indicated and as hereinafter set forth in specific examples, the catalytic particle of the character represented in FIGURE 2 possesses the requisite stability of a catalytic composite intended to serve the function of eliminating noxious components from gaseous combustible waste products, and particularly for converting the hydrocarbonaceous gaseous waste products emanating from the exhaust of an internal combustion engine. Catalytic particles having physical structures illustrated by FIGURES 1, 3 and 4, either have a high initial activity and virtually no stability, or substantially no conversion activity and a high degree of stability. FIGURES 1, 2, 3 and 4 were made from the study of cross-sectional photographs of typical spherical alumina-platinum composites and alumina-alkaline earth-platinum composites prepared in conjunction with the specific examples hereinafter set forth. For purposes of visual study, the impregnated platinum component was made more visible and contrasting through the use of stannous chloride.

Although only spherically shaped particles have been illustrated, it should be understood that the method of embedding or positioning the active metal layer at a finite distance below the surface is adaptable for utilization with inorganic oxide particles of any desired shape. For example, in the case of a carrier particle having the shape of the well-known Raschig ring, a horizontal cross section would show the hollow center, characteristic of the Raschig ring, a band of alumina or alumina-alkaline earth component substantially free from the platinum component, a continuous layer of the platinum component which has been impregnated completely within the alumina, and lastly, an outermost band of carrier substantially free from the platinum component.

The following examples are given for the purpose of illustrating clearly the method of manufacturing the catalytic composite encompassed by the present invention. It is understood that the present invention is not to be unduly limited beyond the scope and spirit of the appended claims, by the conditions, reagents, concentrations or catalytic composites employed within the examples. The data presented within the examples will indicate the benefits to be afforded through the utilization of the present invention, which invention produces a catalytic composite having an additive alkaline earth component and the physical structure illustrated in accompanying FIGURE 2. It will be readily ascertained that the catalytic composite offers particular advantages in a process for the elimination of the products of incomplete combustion from the hydrocarbonaceous exhaust gases emanating from an internal combustion engine, by which method such exhaust gases become innocuous upon being discharged into the atmosphere.

The following examples describe experimental composites which were employed in obtaining data to evaluate the improved catalyst and methods of preparation, as well as use in effecting conversion of hydrocarbons and carbon monoxide in an engine exhaust gas stream. A specific catalyst evaluation test procedure was utilized that was designed to determine the catalytic stability with respect to automotive exhaust conversion. The various catalytic composites are evaluated by a test procedure which simulates actual driving conditions. The test procedure involves the utilization of a standard dynamometer, by which an eight cylinder-internal combustion engine is loaded by a motor-generator. Approximately 440 cc. of each of the catalyst portions are individually evaluated by each being placed within a cylindrical vessel, or converter, having an inside diameter of about 4 inches, the entire apparatus being serially connected into the engine exhaust line. In each case, the catalyst sample is disposed within the converter on a supporting screen to a bed height of about 2 to 3 inches. A second screen is placed above the catalyst bed for the purpose of separating the catalyst from the ¼-inch ceramic balls employed to facilitate the even distribution of the exhaust gases flowing downwardly through the apparatus. Four such catalyst loaded converters are utilized in a given test period; this practice permits the simultaneous testing of different catalysts, and provides an excellent basis for making a comparative study of the results.

Combustion air is pressured into the converter inlet, the flow rate being adjusted such that the average temperature of the catalyst bed is maintained at a level within the range of about 800° F. to about 1700° F. It is preferred that the flow rate of combustion air be held constant at about six pounds per hour, such that the catalyst bed average temperature is maintained at a level of about 950° F. The fuel employed in the test procedure is a blend of catalytically reformed gasoline (40.0%), catalytically cracked gasoline (40.0%) and alkylate (20.0%), and contains 3.0 milliters of tetraethyl lead per gallon. Since the concentration of unburned hydrocarbons, and other noxious products, within the exhaust gases, as well as the throughput thereof, varies in accordance with the physical status of the engine, whether idling, accelerating, cruising or decelerating, the test procedure still further approximates actual road conditions by providing for a constant load throughout only a portion of the entire test period. Samples of the converter inlet and outlet gases are taken at various intervals during the test procedure, there being a constant analysis for the concentration of carbon monoxide. The samples are analyzed for hydrocarbons by a flame-ionization detector. The term "hydrocarbon," as utilized in reporting the results of the analyses performed on the effluent gases from the catalytic converter, connotes all hydrocarbons whether saturated, unsaturated or partially oxidized as hereinbefore set forth. The carbon monoxide concentration within the exhaust gases is determined by an accurate infra-red detector. The internal combustion engine is operated in a particular cycle to simulate idling, accelerating, crusing, and decelerating as experienced under actual road conditions. During the entire test procedure, which covers a period of about 40 hours, about 300 gallons of the aforementioned fuel is employed. The 40-hour test period is divided into eight five-hour cycles; each five-hour cycle consists of a four and one-half hour cruise at a constant 2500 r.p.m. and 41 BHP, and a one-half hour cycle consisting of a series of 15 two-minute cycles comprising idling at 750 r.p.m., accelerating to cruise at 2000 r.p.m., and a deceleration to idling at 750 r.p.m.

An inherent result of the small volume of catalyst employed in the test evaluation procedure is that the space velocity of the exhaust gases coming into contact with the catalyst is considerably higher than would usually be encountered under actual driving conditions. Accordingly, the percentage conversion obtained during actual use in automotive exhaust gas converters would be considerably higher. The data obtained from the 40-hour test procedure is plotted on semi-logarithmic coordinates and results in a curve from which the following equation is derived:

$$C = A e^{-t/k}$$

In the equation, $k$ equals the reciprocal of the slope, $A$ equals the percent initial conversion obtained by extrapolation, $C$ equals the percent conversion in time $t$, and $t$ equals the time in hours. The above equation is employed in computing the "$k$" stability factors for the individual catalytic composites. A decrease in the slope of the curve resulting from the data obtained, or conversely, an increase in "$k$" value, indicates a catalyst possessing a greater degree of stability when converting the hydrocarbonaceous combustion products of an internal combustion engine. In those instances where the "$k$" stability factor is positive, indicating a positive slope, the stability of the catalyst being evaluated may be said to increase with time.

The foregoing described test procedure is employed as a primary evaluation of the catalysts. The importance of this evaluation resides in the "$k$" stability factor of the catalytic composite being tested. That is, although a wide variety of the catalytic composites possess a relative high initial activity, the stability of such catalysts is such that the maximum tolerable limits imposed upon the hydrocarbon and carbon monoxide concentrations are reached in a relatively short period of time. The ⅛-inch diameter alumina spheres, used as the base or carrier for all composites of the following examples, were prepared by the same procedure and had substantially the same physical characteristics and low apparent bulk density of the order of 0.28 gram per cubic centimeter.

In order to evaluate the physical strength of various of the catalyst composites, representative samples were subjected to a standard test procedure to determine the "peripheral crushing strength" (PCS) thereof. The average crushing strength of a particle is determined as the arithmetic average of the force required to crush each particle of a given number of individual particles. Each particle is crushed in an apparatus constructed in such a manner that the force is applied continuously and and at a uniform rate beginning with a zero load.

The crushing strength apparatus consists essentially of a balance beam resting on a knife edge. The knife edge is located at unit distance from an anvil on which the catalyst particle is placed. A cup, which receives the lead shot by which the load is applied, is situated on the other side of the knife edge, four times the unit distance therefrom. The lead shot falls into this cup from a hopper at a rate of about nine pounds per minute, thus loading the particle at a rate of about 36 pounds per minute. A single particle is placed on the anvil of the apparatus, and the beam balanced by means of a small spirit level. Force is applied to the particle by opening the shutter in the bottom of the hopper containing the lead shot, thus allowing the shot to flow in a continuous stream into the cup. The flow of lead shot is immediately, and automatically, cut off when the particle is completely crushed. The weight of lead shot within the cup is multiplied by a factor of four to give the actual peripheral crushing strength of the particle. The procedure is repeated 30 times and the crushing strength taken as the arithmetic average of the observed individual crushing strengths.

Example I

In order to provide reference catalysts for comparison to the use of improved catalysts containing an additive component of clacium, strontium or barium, two catalysts R and R1 were prepared in such a manner that the concentrations of catalytically active metallic component were identical, and the entire manufacturing process would be the same with but one exception; that is, one catalyst was prepared by effecting the impregnation in the presence of citric acid, in accordance with the procedure which has been found to provide oxidation catalysts of an especially high efficiency and stability. The ⅛-inch alumina spheres were divided in two separate portions, each being impregnated with a sufficient quantity of chloroplatinic acid (having a concentration of 0.0628 grams of platinum per milliliter) to yield a catalyst containing 0.32 troy ounce of platinum, calculated as the element thereof, per cubic foot of alumina. For each 150 grams of the alumina spheres, the required quantity of chloroplatinic acid was diluted to 500 milliliters with water. Prior to being impregnated, the impregnating solution for one catalyst portion (R1) was admixed with 0.22% by weight of citric acid, based upon the total quantity of alumina particles. Both catalyst portions were individually and separately evaporated to dryness in a rotating dryer at a temperature of about 210° F. While increasing the temperature to a level of about 1000° F., the catalyst portions were subjected to an atmosphere of hydrogen; after reaching a temperature level of 1000° F., the hydrogen treatment was continued at that temperature for a period of two hours. The catalyst portions were allowed to cool prior to being exposed to the atmosphere.

Upon testing the catalysts in accordance with the procedures outlined, it was found that catalyst R provided an initial hydrocarbon conversion of 79.8% and at the end of 40 hours a conversion of 52.1%, while the stability factor was equal to 93.1. The carbon monoxide conversion was initially 94.7% and after 40 hours 73.8% with a stability factor of 160.0. After the 40 hour period, the lead retention was 10.6%. The peripheral crushing strength (PCS) was found to be 2.0 pounds.

Catalyst R1 provided an initial hydrocarbon conversion of 73.8% and at the end of the 40 hours a conversion of 51.1%, while its stability factor was equal to 108.7. The carbon monoxide conversion was initially 88.2% and after 40 hours 69.9%, with a stability factor of 172.7. After the 40 hour test period, the lead retention 10.7%. The peripheral crushing strength was 2.1 pounds.

Example II

The alumina spheres were, in this example, first treated with barium hydroxide for an overnight period and then washed and dried to provide a resultant alumina-barium oxide base having approximately 4.6% barium, by weight of the composite. This base was then impregnated with chloroplatinic acid and citric acid, where the latter is in an approximate 3 to 1 molar ratio of acid to platinum and yielding 0.32 troy ounces of platinum, calculated as the element thereof, per cubic foot of alumina. The resulting catalytically activated composite was then dried and reduced in the presence of hydrogen for an approximate two hour period at about 1000° F.

Upon testing, the catalyst was found to provide an initial hydrocarbon conversion of 64.3% and at the end of 40 hours a conversion of 60.4%, thus providing a stability factor $K$ of 644.2. The CO conversion was initially 71.4% and after 40 hours 65.8%, with a stability factor of 485.8. Also after the 40 hour period the lead retention was 7.0%. It may thus be noted that the improved stability and reduced lead retention is significantly better than that of the reference catalyst. The peripheral crushing strength was found to be 3.1 pounds, which is also significantly better than the reference catalyst.

Example III

The alumina spheres were, for this example, first treated with a calcium hydroxide solution for an overnight period and then washed and dried to provide a base having a resulting 5.0% of calcium by weight thereof. This base was then treated with chloroplatinic acid and citric acid in quantities providing a 3 to 1 molar ratio of acid to platinum and the resulting composite containing 0.32 troy ounces of platinum per cubic foot of alumina. The composite was then dried and reduced in the presence of hydrogen for an approximate two hour period at a temperature of about 1000° F.

In the testing operation, the catalyst was found to provide an initial hydrocarbon conversion of 64.1% and at the end of 40 hours a conversion of 60.3%, with a resulting stability factor of 663.1. The CO conversion was initially 77.1% and after 40 hours equivalent to 71.7% with a stability factor of 557.8. The lead retention after the 40-hour period was 7.49%. The calcium impregnated catalyst of this example thus provided high stability and a substantially reduced lead retention as compared to the reference catalyst. The peripheral crushing strength was 3.7 pounds.

Example IV

The alumina spheres of this example were treated firstly, with a strontium hydroxide solution for an overnight period of time providing a resulting 4.5% strontium content after washing and drying. Subsequently, the alumina-strontia composite was subjected to a chloroplatinic acid and citric acid solution in the manner set forth in the previous examples providing a resulting dried and reduced composite with approximately 0.32 troy ounces of platinum per cubic foot of alumina.

The catalyst testing procedure was found to provide an initial hydrocarbon conversion of 70.4% and after 40 hours a conversion of 59.7% with a stability factor equivalent to 244.1. The CO conversion was initially 79.8% and after 40 hours 71.9%, with the stability factor 383.2. Lead retention after the 40 hour test period was 5.87%. It may be noted that the strontium containing composite also provided good activity and stability together with a low lead retention as compared with the reference catalyst. The crushing strength was 3.8 pounds.

Example V

In this example, the alumina spheres were treated with chloroplatinic acid in an amount providing 0.32 troy ounce of platinum per cubic foot of alumina as the dried composite and the thus impregnated alumina subsequently dried and reduced in the presence of hydrogen for a two hour period at a temperature of approximately 1000° F. No organic acid was utilized during the impregnation. Subsequently the platinum-alumina spheres were soaked and treated with a barium hydroxide solution to provide a resulting washed and dried catalyst containing therein 6.4% barium by weight of the finished composite.

The test data showed that the catalyst of this example provided a 76.0% initial hydrocarbon conversion and after 40 hours a conversion of 61.5%, with a relatively low stability factor of 190.0. The CO conversion was initially 82.6% and after 40 hours equal to 73.3%, with the stability factor equivalent to 331.7%. Lead retention after 40 hours was 8.48%. The crushing strength was 3.5 pounds.

It may be noted in this example that in particular the hydrocarbon conversion stability was low and the lead retention was increased as compared to composites containing both barium and citric acid.

Example VI

In this example the alumina spheres were initially treated with lithium hydroxide for a period of time providing a resulting alumina-lithia composite containing approximately 5% lithium after the washing and drying of the composite. The resulting base was then treated as hereinbefore set forth with chloroplatinic acid and citric acid to provide the 0.32 troy ounce of platinum per cubic foot of alumina after drying and reduction.

The testing operation shows that the initial hydrocarbon conversion was 65.9% and after 40 hours a conversion was 49.7%, with the stability factor equivalent to 141.4. The CO conversion was initially 78.3% and after 40 hours 64.2%, with the stability factor equivalent to 202.4. Lead retention was 9.3% after the 40 hour test period. Like magnesia in the previous example it appears that lithium oxide in the catalyst composite did not provide a highly stable catalyst, particularly for hydrocarbon conversions, and that the lead retention is relatively high as compared to the composites of Examples II, III and IV.

Example VII

In this example the alumina spheres were impregnated initially with a chloroplatinic acid and citric acid solution with citric acid being in a molar ratio of 1.25 acid to platinum to provide a resulting reduced composite containing 0.47 troy ounce of platinum per cubic foot of alumina. The composite was then treated with beryllium oxide, using the beryllium as a formate by dissolving the beryllium hydroxide in formic acid. The composite, after being rinsed and dried, contained approximately 5% beryllium oxide.

In the testing operation it was found that the initial hydrocarbon conversion was 74.2% and after 40 hours 40.7%, with a stability factor of 66.6. The CO conversion was initially 81.1% and after 40 hours 67.4% with a stability factor equal to 215.6. The lead retention after the 40 hour period was 10.9%. The crushing strength was 4.7 pounds. Again, the composite of this example shows relatively low stability factors, particularly for the hydrocarbon conversion, while the lead retention was high as compared with the catalyst composites containing calcium, strontium or barium.

Example VIII

The alumina spheres in this example were treated initially with chloroplatinic acid and citric acid in a molar ratio of same as in the previous example to provide a resulting platinum alumina composite containing 0.47 troy ounce per cubic foot of alumina after drying and reducing in hydrogen. The composite was then treated with barium oxide, as a formate solution which was formed by dissolving barium oxide in formic acid. A resulting rinsed and dried composite contained approximately 5% barium oxide.

On testing, it was found that this catalyst composite provided an initial hydrocarbon conversion of 75.8% and after 40 hours a conversion of 69.1% with a stability of 429.2. The CO conversion was initially 75.9% and after 40 hours 80.7%, with a stability factor of 650.7. The lead retention after 40 hours was 7.95%. The crushing strength was 2.0 pounds. It may be noted that the present catalyst compares favorably with the other calcium, strontium and barium composites where such oxides were formed utilizing the hydroxides.

Example IX

In this example, the alumina spheres were initially treated with chloroplatinic acid and citric acid in the manner of the two previous examples to provide a resulting 0.47 troy ounce of platinum per cubic foot of alumina. The reduced composite was then treated with a solution of magnesium oxide, as a formate, for a period of time providing a resulting washed and dried composite containing approximately 5% magnesia.

Upon testing, the catalyst was found to provide an initial hydrocarbon conversion of 76.8% and after 40 hours 56.3%, with a stability equal to 129.1. The CO conversion was initially 80.6% and after 40 hours 76.7%, with a stability factor of 811.1. The lead retention after 40 hours was 9.46%. The crushing strength was 1.8 pounds. Again, it may be noted that the catalyst composite of this example showed relatively poor hydrocarbon conversion stability and a relatively high lead retention.

Example X

In this example two different catalysts were subjected to high temperature calcination and the results compared. In one instance a "standard" form of platinum-alumina catalyst was prepared in accordance with the catalyst R1 of Example I; however, subsequent to the reduction step, the catalyst was subjected to a high temperature calcination of 1800° F. A second batch of catalyst was prepared in the manner set forth except that the platinum-alumina composite was treated with barium hydroxide in an amount and for a period of time providing a resulting dried and reduced composite containing approximately 5% barium oxide. This composite was also subjected to high temperature calcination in air at 1800° F.

The test procedure showed that the catalyst without the barium oxide additive provided an initial hydrocarbon conversion of 59.9% and after 40 hours a conversion of 32.8%, with a stability factor of 66.4%. The CO conversion was initially 72.6% and after 40 hours 50.7% with a stability factor of 112.6. Lead retention was 10.8% after the 40 hour period.

On the other hand, the catalyst composite containing the barium oxide provided a 65.7% initial conversion for hydrocarbons and after 40 hours 61.6%, with a 611.6 stability factor. The CO conversion was initialy 72.9% and after 40 hours 69.3%, with a stability factor of 777.0. The lead retention after 40 hours was 7.20%. The crushing strength was 3.3 pounds.

The barium oxide containing catalyst thus shows significantly greater stability and less lead retention, even though calcined to a high temperature, as compared with the standard catalyst without the alkaline earth additive.

Example XI

In this example the alumina spheres were treated with chloroplatinic acid and citric acid in a 3 to 1 molar ratio in an amount providing 0.32 troy ounce of platinum per cubic foot of alumina as a resulting dried composite and the thus impregnated alumina was subsequently dried at a temperature in the 200° to 300° F. range and reduced in the presence of hydrogen for an approximate two hour period at the temperature of the order of about 1000° F. The platinum-alumina catalyst was then treated with a barium hydroxide solution containing 10% barium oxide, by weight of the alumina content of the composite, with such treatment being for an overnight period of from 16 to 20 hours. The platinum-alumina-barium oxide composite was then rinsed, dried and calcined at 1800° F. to provide a finished catalyst.

The test procedure showed an initial hydrocarbon conversion of 65.0% and after 40 hours a conversion of 59.5%, with a stability factor of 451.0. The CO conversion was initially 68.9% and after 40 hours 67.1%, with a stability factor of 1550.7. Lead retention was 6.74% after the 40 hour period. The peripheral crushing strength was 5.1 pounds.

Example XII

In this example the alumina spheres were treated with a chloroplatinic acid and citric acid in a three to one molar ratio providing a resulting composite containing 0.32 troy ounce of platinum per cubic foot of alumina after drying and reducing in accordance with the foregoing example. Resulting platinum-alumina composite was then treated with calcium hydroxide solution containing 2% calcium oxide by weight of the alumina content of the composite for an overnight period of from 16 to 20 hours and then subsequently rinsed, dried and calcined at a temperature of the order of 1000° F. Actual analysis showed 1% calcium present in the composite.

The test procedure showed an initial hydrocarbon conversion of 68.3% and after 40 hours a conversion of 61.5% with a stability factor of 385.9. The CO conversion was initially 74.9% and after 40 hours a conversion of 77.7% with a stability factor of 1077.4. Lead retention was 8.76% after the 40 hour period. The crushing strength was 2.5 pounds.

Example XIII

In this example the alumina spheres were treated with a chloroplatinic acid and citric acid in a three to one molar ratio providing a resulting composite containing 0.32 troy ounce of platinum per cubic foot of alumina after drying and reducing in accordance with the foregoing example. The resulting platinum-alumina composite was then treated with a calcium hydroxide solution containing 10% calcium oxide by weight of the alumina content of the composite for an overnight period of from 16 to 20 hours and then subsequently rinsed, dried and calcined at a temperature of the order of 1000° F. Actual analysis of the composite showed 3.0% calcium present therein.

The test procedure showed an initial hydrocarbon conversion of 70.9% and after 40 hours a conversion of 63.4%, with a stability factor of 358.6. The CO conversion was initially 73.1% and after 40 hours a conversion of 74.6% with a stability factor of 1926.9 Lead retention was 8.92% after the 40 hour period and the crushing strength was 3.7 pounds.

Example XIV

In this example the alumina spheres were treated with a chloroplatinic acid and citric acid in three to one molar ratio providing a resulting composite containing 0.32 troy ounce of platinum per cubic foot of alumina after drying and reducing in accordance with the foregoing Example XI. The resulting platinum-alumina composite was then treated with calcium hydroxide solution containing 30% calcium oxide by weight of the alumina content of the composite for an overnight period of from 16 to 20 hours and then subsequently rinsed, dried and calcined at a temperature of the order of 1000° F. Actual analysis of the composite showed 8.5% calcium present therein.

The test procedure showed an initial hydrocarbon conversion of 42.9% and after 40 hours a conversion of 13.8% with a stability factor of 35.4. The CO conversion was initially 46.9% and after 40 hours a conversion of 21.5% with a stability factor of 51.2. The lead retention was 5.66% after the 40 hour period and the crushing strength was 4.0 pounds.

Example XV

In this example the alumina spheres were treated with a chloroplatinic acid and citric acid in a three to one molar ratio providing a resulting composite containing 0.32 troy ounce of platinum per cubic foot of alumina after drying and reducing in accordance with Example XI. The resulting platinum-alumina composite was then treated with a strontium hydroxide solution containing 2% strontium oxide by weight of the alumina content of the composite for an overnight period of from 16 to 20 hours and then subsequently rinsed, dried and calcined at a temperature of the order of 1000° F. The actual analysis of the composite indicated 1.1% strontium present therein.

The test procedure showed an initial hydrocarbon conversion of 67.0% and after 40 hours a conversion of 63.0%, with a stability factor of 649.2. The CO conversion was initially 73.2% and after 40 hours a conversion of 78.0% with a stability factor of 623.3. The lead retention was 8.76% after the 40 hour period and the crushing strength was 2.5 pounds.

Example XVI

In this example the alumina spheres were treated with a chloroplatinic acid and citric acid in a three to one molar ratio providing a resulting composite containing 0.32 troy ounce of platinum per cubic foot of alumina after drying and reducing in accordance with Example XI. The resulting platinum-alumina composite was then treated with a strontium hydroxide solution containing 10% strontium oxide by weight of the alumina content of the composite for an overnight period of from 16 to 20 hours and then subsequently rinsed, dried and calcined at a temperature of the order of 1000° F. Actual analysis showed 3.1% strontium present therein.

The test procedure showed an initial hydrocarbon conversion of 68.5% and after 40 hours a conversion of 64.6% with a stability factor of 688.0. The CO conversion was initially 69.6% and after 40 hours a conversion of 74.9% with a stability factor of 549.9. The lead retention was 8.40% after the 40 hour period and the crushing strength was 4.1 pounds.

Example XVII

In this example the alumina spheres were treated with a chloroplatinic acid and citric acid in a three to one molar ratio providing a resulting composite containing 0.32 troy ounce of platinum per cubic foot of alumina after drying and reducing in accordance with Example XI. The resulting platinum-alumina composite was then treated with a strontium hydroxide solution containing 30% strontium oxide by weight of the alumina content of the composite for an overnight period of from 16 to 20 hours and then subsequently rinsed, dried and calcined at a temperature of the order of 1000° F. Actual analysis of the composite showed 14.0% strontium present therein.

The test procedure showed an initial hydrocarbon conversion of 40.3% and after 40 hours a conversion of 35.5% with a stability factor of 317.6. The CO conversion was initially 45.1% and after 40 hours a conversion of 45.8% with a stability factor of 3888.9. The lead retention was 6.41% after the 40 hour period and the crushing strength was 3.6 pounds.

Example XVIII

In this example the alumina spheres were treated with a chloroplatinic acid and citric acid in a three to one molar ratio providing a resulting composite containing 0.32 troy ounce of platinum per cubic foot of alumina after drying and reducing in accordance with Example XI. The resulting platinum-alumina composite was then treated with a barium hydroxide solution containing 2% barium oxide by weight of the alumina content of the composite for an overnight period of from 16 to 20 hours and then subsequently rinsed, dried and calcined at a temperature of the order of 1000° F. Actual analysis of the composite showed 2.3% barium present therein.

The test procedure showed an initial hydrocarbon conversion of 68.5% and after 40 hours a conversion of 63.7% with a stability factor of 549.8. The CO conversion was initially 74.5% and after 40 hours a conversion of 78.4% with a stability factor of 792.0+. The lead retention was 9.19% after the 40 hour period and the crushing strength was 2.3 pounds.

Example XIX

In this example the alumina spheres were treated with a chloroplatinic acid and citric acid in a three to one molar ratio providing a resulting composite containing 0.32 troy ounce of platinum per cubic foot of alumina after drying and reducing in accordance with Example XI. The resulting platinum-alumina composite was then treated with a barium hydroxide solution containing 10% barium oxide by weight of the alumina content of the composite for an overnight period of from 16 to 20 hours and then subsequently rinsed, dried and calcined at a temperature of the order of 1000° F. Actual analysis of the composite showed 6.4% barium present therein.

The test procedure showed an initial hydrocarbon conversion of 65.6% and after 40 hours a conversion of 66.2% with a stability factor of 4400.0+. The CO conversion was initially 67.7% and after 40 hours a conversion of 76.1% with a stability factor 343.9. The lead retention was 8.92% after the 40 hour period and the crushing strength was 4.1 pounds.

Example XX

In this example the alumina spheres were treated with a chloroplatinic acid and citric acid in a three to one molar ratio providing a resulting composite containing 0.32 troy ounce of platinum per cubic foot of alumina after drying and reducing in accordance with Example XI. The resulting platinum-alumina composite was then treated with a barium hydroxide solution containing 30% barium oxide by weight of the alumina content of the composite for an overnight period of from 16 to 20 hours and then subsequently rinsed, dried and calcined at a temperature of the order of 1000° F. Actual analysis of the composite showed a 11.0% barium content present therein.

The test procedure showed an initial hydrocarbon conversion of 64.0% and after 40 hours a conversion of 64.3% with a stability factor of 8405.9. The CO conversion was initially 69.3% and after 40 hours a conversion of 76.2% with a stability factor of 421.0. The lead retention was 6.30% after the 40 hour period and the crushing strength was 3.8 pounds.

For convenience in comparing the resulting data from the various test procedures, the results of the foregoing Examples I through XX are recapitulated in the accompanying Table I.

It may again be set forth that of the alkaline earth metals, the calcium, strontium and barium components are substantially preferable and of these three barium, together with the citric acid additive with the platinum impregnation, is generally the most desirable component. Also, in preparing the various improved catalyst composites, it does not appear to make any material difference as to whether the alkaline earth component is added before or after the organic acid and the chloroplatinic acid impregnation. However, the two additive components cannot be added simultaneously because there is a neutralization of the acid effect on the platinum impregnation by the alkaline component.

It may be still further noted that an excess of one percent of an alkaline earth is preferable to properly improve conversion results and to increase the crushing strength of the catalyst composite.

To show visually a difference between various of the preferred composites, reference is made to the accompanying FIGURE 5, which plots in a graphical manner the initial hydrocarbon conversion results against the 40 hour hydrocarbon conversion results. Thus, such catalyst that provide results high on the graph and close to or above the line A (which is a line of equivalent percentages) are preferred composites. Also, for comparison purposes conversion results of a standard platinum-alumina catalyst are plotted on the FIGURE 5 graph, as obtained from the data of Example I. Thus, it will be seen that the selected alkaline earth components together with the organic acid used during the platinum impregnation have a particularly valuable effect on the catalyst composite for both strength and oxidation efficiency and stability. Where the particular composites were subjected to 1800° F. calcination, as a means for providing a measure of high temperature stability, there is particularly noticeable the high temperature stability for the alumina-platinum-barium composite, as compared to the calcium and strontium composites.

TABLE I

| Ex. No. | Type of Catalyst | Hydrocarbon Conversion | | | CO Conversion | | | Percent Lead Retention | Pounds Crushing Strength |
|---|---|---|---|---|---|---|---|---|---|
| | | A | 40 hr. | K | A | 40 hr. | K | | |
| I | "R"—$Al_2O_3$+.32 Tr. oz. Pt per cu. ft. | 79.8 | 52.1 | 93.1 | 94.7 | 73.8 | 160.0 | 10.6 | 2.0 |
| | "R-1"—$Al_2O_3$+.32 Tr. oz. Pt/cu. ft. and C.A. | 73.8 | 51.1 | 108.7 | 88.2 | 69.9 | 172.7 | 10.7 | 2.1 |
| II | $Al_2O_3$+$Ba(OH)_2$+.32 Tr. oz. Pt/cu. ft. and 9C.A. (4.6% Ba). | 64.3 | 60.4 | 644.2 | 71.4 | 65.8 | 485.8 | 7.0 | 3.1 |
| III | $Al_2O_3$+$Ca(OH)_2$+.32 Tr. oz. Pt/cu. ft. and C.A. (5.0% Ca). | 64.1 | 60.3 | 663.1 | 77.1 | 71.7 | 557.8 | 7.49 | 3.7 |
| IV | $Al_2O_3$+$Sr(OH)_2$+.32 Tr. oz. Pt/cu. ft. and C.A. (4.5% Sr). | 70.4 | 59.7 | 244.1 | 79.8 | 71.9 | 383.2 | 5.87 | 3.8 |
| V | $Al_2O_3$+.32 Tr. oz. Pt/cu. ft.+$Ba(OH)_2$ (6.4% Ba). | 76.0 | 61.5 | 190.0 | 82.6 | 73.3 | 331.7 | 8.48 | 3.5 |
| VI | $Al_2O_3$+$Li(OH)_2$+.32 Tr. oz. Pt/cu. ft. and C.A. (5% Li). | 65.9 | 49.7 | 141.4 | 78.3 | 64.2 | 202.4 | 9.3 | |
| VII | $Al_2O_3$+BeO+.47 Tr. oz. Pt/cu. ft. and 1.25 C.A. (5% BeO). | 74.2 | 40.7 | 66.6 | 81.1 | 67.4 | 215.6 | 10.9 | 4.7 |
| VIII | $Al_2O_3$+.47 Tr. oz. Pt/cu. ft. and C.A.+BaO as formate (5% BaO). | 75.8 | 69.1 | 429.2 | 75.9 | 80.7 | 650.7 | 7.95 | 2.0 |
| IX | $Al_2O_3$+.47 Tr. oz. Pt/cu. ft. and C.A.+MgO (5% Mg). | 76.8 | 56.3 | 129.1 | 80.6 | 76.7 | 811.1 | 9.46 | 1.8 |
| X | "R-1"—$Al_2O_3$+.32 Tr. oz. Pt/cu. ft. and C.A. at 1,800° F. Calc. | 59.9 | 32.8 | 66.4 | 72.6 | 50.7 | 112.6 | 10.8 | |
| | $Al_2O_3$+.32 Tr. oz. Pt/cu. ft. and C.A.+$Ba(OH)_2$ at 1,800°F. Calc. (5% Ba) | 65.7 | 61.6 | 611.6 | 72.9 | 69.3 | 777.0 | 7.20 | 3.3 |
| XI | $Al_2O_3$+.32 Tr. oz. Pt/cu. ft. and C.A.+$Ba(OH)_2$ at 1,800°F. calc. (10% BaO). | 65.0 | 59.5 | 451.0 | 68.9 | 67.1 | 1,550.7 | 6.74 | 5.1 |
| XII | $Al_2O_3$+.32 Tr. oz. Pt/cu. ft. and C.A.+$Ca(OH)_2$ (1.0% Ca). | 68.3 | 61.5 | 385.9 | 74.9 | 77.7 | 1,077.4 | 8.76 | 2.5 |
| XIII | $Al_2O_3$+.32 Tr. oz. Pt/cu. ft. and C.A.+$Ca(OH)_2$ (3.0% Ca). | 70.9 | 63.4 | 358.6 | 73.1 | 74.6 | 1,926.9 | 8.92 | 3.7 |
| XIV | $Al_2O_3$+.32 Tr. oz. Pt/cu. ft. and C.A.+$Ca(OH)_2$ (8.5% Ca). | 42.9 | 13.8 | 35.4 | 46.9 | 21.5 | 51.2 | 5.66 | 4.0 |
| XV | $Al_2O_3$+.32 Tr. oz. Pt/cu. ft. and C.A.+$Sr(OH)_2$ (1.1% Sr). | 67.0 | 63.0 | 649.2 | 73.2 | 78.0 | 623.3 | 8.76 | 2.5 |
| XVI | $Al_2O_3$+.32 Tr. oz. Pt/cu. ft. and C.A.+$Sr(OH)_2$ (3.1% Sr). | 68.5 | 64.6 | 688.0 | 69.6 | 74.9 | 549.9 | 8.40 | 4.1 |
| XVII | $Al_2O_3$+.32 Tr. oz. Pt/cu. ft. and C.A.+$Sr(OH)_2$ (14.0% Sr). | 40.3 | 35.5 | 317.6 | 45.1 | 45.8 | 3,888.9 | 6.41 | 3.6 |

TABLE I.—Continued

| Ex. No. | Type of Catalyst | Hydrocarbon Conversion | | | CO Conversion | | | Percent Lead Retention | Pounds Crushing Strength |
|---|---|---|---|---|---|---|---|---|---|
| | | A | 40 hr. | K | A | 40 hr. | K | | |
| XVIII | Al₂O₃+.32 Tr. oz. Pt/cu. ft. and C.A.+ Ba(OH)₂ (2.3% Ba). | 68.5 | 63.7 | 549.8 | 74.5 | 78.4 | 792.0+ | 9.19 | 2.3 |
| XIX | Al₂O₃+.32 Tr. oz. Pt/cu. ft. and C.A.+ Ba(OH)₂ (6.4% Ba). | 65.6 | 66.2 | 4,400.0+ | 67.7 | 76.1 | 343.9 | 8.92 | 4.1 |
| XX | Al₂O₃+.32 Tr. oz Pt/cu. ft. and C.A.+ Ba(OH)₂ (11.0% Ba). | 64.0 | 64.3 | 8,405.9 | 69.3 | 76.2 | 421.0 | 6.30 | 3.8 |

I claim as my invention:

1. A catalyst particle comprising a porous alumina carrier material, an oxide of an alkaline earth component selected from the group consisting of calcium, strontium and barium distributed substantially uniformly throughout the carrier portion of the particle in an amount in the range of from above about 1% to 20% by weight of alumina, and platinum in an amount from above 0.01% to about 1.0% by weight of alumina, said platinum component being embedded as a layer a finite distance below the surface of said carrier portion of the particle and a finite distance from the center thereof.

2. A catalyst comprising a substantially spherical particle of a porous alumina carrier, from about 0.01% to about 1.0% by weight of such carrier of platinum which is embedded as a layer a finite distance below the surface of the particle and a finite distance from the center thereof, and from about 1% to about 20% by weight of an alkaline earth component selected from the group consisting of calcium strontium, and barium, distributed substantially uniformly throughout the alumina portion of the particle.

3. The catalyst of claim 2 further characterized in that said alkaline earth component comprises barium.

References Cited

UNITED STATES PATENTS

| | | | |
|---|---|---|---|
| 3,291,564 | 12/1966 | Kearby | 23—2.2 |
| 2,927,088 | 3/1960 | Michalko et al. | 252—466 |
| 3,100,234 | 8/1963 | Lee | 252—473 |
| 3,179,488 | 4/1965 | Appell | 252—466 |
| 3,198,748 | 8/1965 | Keith | 252—473 |
| 3,259,454 | 7/1966 | Michalko | 23—2.2 |
| 3,259,589 | 7/1966 | Michalko | 252—466 |
| 3,271,324 | 9/1966 | Stephens et al. | 252—466 |
| 3,271,325 | 9/1966 | Daires et al. | 252—466 |
| 2,972,644 | 2/1961 | Holmes et al. | 252—466 X |
| 3,224,831 | 12/1965 | Stephens | 23—2 |

DANIEL E. WYMAN, *Primary Examiner.*

PATRICK P. GARVIN, EARL C. THOMAS, *Examiners.*

L. G. XIARHOS, *Assistant Examiner.*